United States Patent
Dahan et al.

[11] Patent Number: 6,137,763
[45] Date of Patent: Oct. 24, 2000

[54] METHOD AND APPARATUS FOR BUFFERING DATA IN A MULTI-BEAM OPTICAL DISK READER

[75] Inventors: Shalom Dahan, Rehovot; Koby Finklestein, Kfar Saba; Aharon Nagad, Holon, all of Israel

[73] Assignee: Zen Research N.V., Curacao, Netherlands Antilles

[21] Appl. No.: 09/159,998

[22] Filed: Sep. 24, 1998

[51] Int. Cl.$^7$ .................................................. G11B 3/74
[52] U.S. Cl. .................... 369/95; 369/49; 369/124.02; 369/124.08
[58] Field of Search ................... 369/47, 48, 49, 369/60.01, 95, 112, 124.01, 124.02, 124.03, 124.08, 124.09

[56] References Cited

U.S. PATENT DOCUMENTS

| | | | |
|---|---|---|---|
| 4,074,085 | 2/1978 | Russell | 179/100.3 |
| 4,283,777 | 8/1981 | Curry et al. | 369/32 |
| 4,449,212 | 5/1984 | Reno | 369/44 |
| 4,459,690 | 7/1984 | Corsover et al. | 369/44 |
| 4,460,988 | 7/1984 | Gordon | 369/32 |
| 4,486,870 | 12/1984 | Pettigrew et al. | 369/32 |
| 4,536,866 | 8/1985 | Jerome et al. | 369/112 |
| 4,566,092 | 1/1986 | Gérard et al. | 369/59 |
| 4,583,211 | 4/1986 | Nishikawa et al. | 369/59 |
| 4,646,280 | 2/1987 | Toyosawa | 369/50 |
| 4,689,781 | 8/1987 | Ando | 369/112 |
| 4,720,825 | 1/1988 | Kokado | 369/46 |
| 4,754,446 | 6/1988 | Reno | 369/112 |
| 4,766,582 | 8/1988 | Ando | 369/45 |
| 4,815,067 | 3/1989 | Webster et al. | 369/97 |
| 4,817,035 | 3/1989 | Timsit | 364/900 |
| 4,839,876 | 6/1989 | Fennema | 369/32 |
| 4,882,546 | 11/1989 | Takamura et al. | 329/310 |
| 4,890,272 | 12/1989 | Ando | 369/45 |
| 4,918,676 | 4/1990 | Miyasaka | 369/32 |
| 4,972,396 | 11/1990 | Rafner | 369/32 |

(List continued on next page.)

FOREIGN PATENT DOCUMENTS

| | | |
|---|---|---|
| 0 089 264 A1 | 9/1983 | European Pat. Off. . |
| 0 273 384 A1 | 7/1988 | European Pat. Off. . |
| 0 506 447 A1 | 9/1992 | European Pat. Off. . |
| 0 569 718 A3 | 11/1993 | European Pat. Off. . |
| 0 598 611 A2 | 5/1994 | European Pat. Off. . |
| 0 643 388 A1 | 3/1995 | European Pat. Off. . |
| 0 712 119 A2 | 5/1996 | European Pat. Off. . |
| 0 714 096 A1 | 5/1996 | European Pat. Off. . |
| 60-173724 | 9/1985 | Japan . |
| 61-08563 | 5/1986 | Japan . |
| 06089440 | 3/1994 | Japan ............................ G11B 7/00 |
| 2 188 474 | 9/1987 | United Kingdom . |

OTHER PUBLICATIONS

U.S. application No. 08/911,815, Lee, filed Aug. 15, 1997.

Ken C. Pohlmann, *The Compact Disc Handbook*, A–R Editions, Inc., pp. 108–115, 1992.

Ken C. Pohlmann, The Compact Disc Handbook 2d ed., pp. 213–221, 1992.

*Primary Examiner*—Paul W. Huber
*Attorney, Agent, or Firm*—Fish & Neave; Nicola A. Pisano; Christopher J. Frerking

[57] ABSTRACT

Methods and apparatus are disclosed for buffering and reordering data blocks read simultaneously from multiple tracks of an optical disk, so that they may be delivered in sequential order to a host computer. The methods involve the use of numerous processes to receive read commands, position an optical pickup, handle memory management tasks, process data blocks as they arrive, and send data blocks to the host computer in sequential order as they become available. The reordering of data blocks is achieved by checking each data block as it arrives in a "read process" to see if it may be linked in a sequential chain with a data block that arrived from the next track. Additionally, methods for determining if a requested data block is in the range of blocks that are currently being read, and methods for determining when the optical pickup may be moved to read the next set of tracks are described.

40 Claims, 10 Drawing Sheets

U.S. PATENT DOCUMENTS

| | | | |
|---|---|---|---|
| 4,980,876 | 12/1990 | Abate et al. | 369/44.11 |
| 4,982,395 | 1/1991 | MacAnally | 369/44.37 |
| 4,989,190 | 1/1991 | Kuroe et al. | 369/32 |
| 5,001,732 | 3/1991 | Nomura et al. | 377/3 |
| 5,081,617 | 1/1992 | Gelbart | 369/112 |
| 5,105,407 | 4/1992 | Ishika | 369/44.37 |
| 5,105,410 | 4/1992 | Maeda et al. | 369/44.37 |
| 5,111,445 | 5/1992 | Psaltis et al. | 369/103 |
| 5,128,919 | 7/1992 | Narahara et al. | 369/97 |
| 5,140,577 | 8/1992 | Ohsato | 369/44.37 |
| 5,144,616 | 9/1992 | Yasukawa et al. | 369/122 |
| 5,150,347 | 9/1992 | Yanagi | 369/44.37 |
| 5,199,017 | 3/1993 | Kagami et al. | 369/44.28 |
| 5,210,726 | 5/1993 | Jackson et al. | 369/32 |
| 5,233,583 | 8/1993 | Reno | 369/44.26 |
| 5,239,529 | 8/1993 | Tobita et al. | 369/48 |
| 5,239,530 | 8/1993 | Seo et al. | 369/54 |
| 5,245,597 | 9/1993 | Lee et al. | 369/44.28 |
| 5,249,170 | 9/1993 | Yoshimaru et al. | 369/48 |
| 5,274,507 | 12/1993 | Lee | 360/39 |
| 5,283,776 | 2/1994 | Takagi | 369/58 |
| 5,295,125 | 3/1994 | Oonishi et al. | 369/44.29 |
| 5,301,174 | 4/1994 | Matoba et al. | 369/44.28 |
| 5,313,448 | 5/1994 | Sukeda et al. | 369/121 |
| 5,331,618 | 7/1994 | Nagai | 369/59 |
| 5,347,506 | 9/1994 | Matsudo et al. | 369/124 |
| 5,361,245 | 11/1994 | Yoshida et al. | 369/44.28 |
| 5,377,178 | 12/1994 | Saito et al. | 369/124 |
| 5,394,386 | 2/1995 | Park et al. | 369/44.28 |
| 5,398,228 | 3/1995 | Maeda | 369/124 |
| 5,402,399 | 3/1995 | Oshiba et al. | 369/32 |
| 5,426,623 | 6/1995 | Alon et al. | 369/32 |
| 5,465,244 | 11/1995 | Kobayashi et al. | 369/50 |
| 5,483,511 | 1/1996 | Jewell et al. | 369/44.37 |
| 5,485,438 | 1/1996 | Koyama | 369/44.28 |
| 5,508,990 | 4/1996 | Nagasaki et al. | 369/60 |
| 5,555,539 | 9/1996 | Kamisada et al. | 369/219 |
| 5,561,654 | 10/1996 | Hamilton et al. | 369/97 |
| 5,566,159 | 10/1996 | Shapira | 369/99 |
| 5,581,715 | 12/1996 | Verinsky et al. | 395/309 |
| 5,583,836 | 12/1996 | Rokutan et al. | 369/44.28 |
| 5,600,626 | 2/1997 | Yokogawa et al. | 369/275.3 |
| 5,608,716 | 3/1997 | Koyama et al. | 369/275.1 |
| 5,627,805 | 5/1997 | Finkelstein et al. | 369/32 |
| 5,659,528 | 8/1997 | Kojima et al. | 369/48 |
| 5,701,283 | 12/1997 | Alon et al. | 369/44.1 |
| 5,761,709 | 6/1998 | Kranich | 711/122 |
| 5,828,643 | 10/1998 | Takeda et al. | 369/103 |
| 5,907,526 | 5/1999 | Alon et al. | 369/32 |

METHOD AND APPARATUS FOR BUFFERING DATA IN A MULTI-BEAM OPTICAL DISK READER

FIELD OF THE INVENTION

The present invention relates to reading data from multiple tracks of an optical disk simultaneously. More specifically, the present invention provides methods and apparatus for efficiently buffering and reordering blocks of data that are simultaneously read from multiple tracks of an optical disk, so they may be delivered in sequential order to a host computer.

BACKGROUND OF THE INVENTION

Due to their high storage density, long data retention life, and relatively low cost, optical disks have become the predominant media format for distributing information. Large format disks, and more recently, DVD disks, have been developed for storing full length motion pictures. The compact disk (CD) format was developed and marketed for the distribution of musical recordings and has replaced vinyl records. High-capacity, read-only data storage media, such as CD-ROM and DVD-ROM, have become prevalent in the personal computer field, and the DVD format may soon replace videotape as the distribution medium of choice for video information.

An optical disk is made of a transparent disk or substrate in which data, in the form of a serial bit-stream, are encoded as a series of pits in a reflective surface within the disk. The pits are arranged along a spiral or circular track. Data are read from the optical disk by focusing a low power laser beam onto a track on the disk and detecting the light reflected from the surface of the disk. By rotating the optical disk, the light reflected from the surface of the disk is modulated by the pattern of the pits rotating into and out of the field of laser illumination. Optical and imaging systems detect the modulated, reflected, laser light and produce an electrical signal that is decoded to recover the digital data stored on the optical disk.

To retrieve data from an optical disk, the optical system includes a pickup assembly that may be positioned to read data on any disk track. Servo mechanisms are provided for focusing the optical system and for keeping the pickup assembly positioned over the track, despite disk warpage or eccentricity. Additional detail on previously known optical disk readers may be found in H. Nakajima and H. Ogawa, *Compact Disc Technoloay*, (translated by C. Aschmann), published by Ohmsha, Ltd., Japan (1992), and in K. Pohlmann, *The Compact Disc Handbook*, (2nd ed. 1992), published by A-R Editions, Inc., Madison, Wis.

Because in most previously known systems the data are read from the disk serially, i.e. one bit at a time, the maximum data transfer rate for an optical disk reader is determined by the rate at which the pits pass by the pickup assembly. The linear density of the bits and the track pitch are fixed by the specification of the particular optical disk format. For example, CD disks employ a track pitch of 1.6 $\mu$m, while DVD employs a track pitch only about one-half as wide.

Previously known methods of increasing the data transfer rate of optical disk readers have focused on increasing the rate at which the pits pass by the pickup assembly by increasing the rotational speed of the disk itself. Currently, constant linear velocity (CLV) drives with rotational speeds of up to 16× standard speed are commercially available, and even faster reading speeds have been achieved using constant angular velocity designs. Higher disk rotational speeds, however, place increased demands on the optical and mechanical subsystems within the optical disk player, create greater vibration, and may make such players more difficult and expensive to design and manufacture.

A cost effective alternative to increasing the disk rotational speed is to read multiple data tracks simultaneously. One such implementation uses multiple beams, arranged so that each beam illuminates a single data track on a disk. U.S. Pat. No. 5,144,616 to Yasukawa et al. shows a system in which multiple laser diode emitters are used to provide multiple beams. Other methods may also be used to provide multiple beams, though some of these methods may not be appropriate for use in writing multiple tracks simultaneously. For example, U.S. Pat. No. 4,459,690 to Corsover describes a multi-beam system in which an illumination beam generated by a single laser source is split into multiple beams using an acousto-optic device that dithers the beam in a direction normal to the track direction.

The beams in a multi-beam optical pickup may also be provided by using a diffractive element to split a single beam into multiple beams. This technique is used to generate the beams in a three-beam tracking system, as shown in *The Compact Disc Handbook*, Pohlmann, K., 2nd ed., A-R Editions, 1992, pp. 108–115. In commonly assigned, copending U.S. patent application Ser. No. 08/911,815, a diffractive element is used to split an illumination beam into a plurality of reading beams. Through careful design, it is possible to produce a diffractive element capable of generating multiple reading beams properly aligned with the data tracks of an optical disk.

One difficulty encountered by optical disk readers that read multiple tracks of an optical disk simultaneously is delivering data to the host computer in sequential order. When reading a typical optical disk, each of the multiple beams in a multi-beam system reads a sequence of blocks of data. The blocks read by each beam are not sequential with the blocks read by other beams. For example, a first beam of a multi-beam optical disk reader may read data block 100 of an optical disk, while a second beam is reading data block 126, and a third beam is reading block 157. Thus, data blocks are read from the disk in a non-sequential order.

Moreover, it is necessary to determine when all the data blocks of one set of tracks have been read, so that the optical pickup can be moved to read a new set of tracks. If this determination is inaccurate, many data blocks may need to be read more than once, decreasing the efficiency and performance of the optical disk reader. Also, when the optical pickup is moved, it is necessary to make sure that one of the tracks being read contains a desired data block.

The host computer that receives data from an optical disk reader typically requires that the data be delivered in sequential order. Thus, it is necessary for optical disk readers that read multiple tracks simultaneously to reorder the data blocks, so they may be delivered sequentially to the host computer.

It would therefore be desirable to provide methods and apparatus for buffering data that is simultaneously read from multiple tracks of an optical disk, and for reordering the data so it may be delivered to a host computer in sequential order.

It would further be desirable to provide methods and apparatus for determining when all of the data blocks in a set of tracks have been read, permitting the optical pickup to be moved to read a new set of tracks.

Additionally, it would be desirable to provide methods and apparatus for determining whether a set of tracks of an optical disk contains a desired data block.

SUMMARY OF THE INVENTION

In view of the foregoing, it is an object of the present invention to provide methods and apparatus for buffering data that is simultaneously read from multiple tracks of an optical disk, and for reordering the data so it may be delivered to a host computer in sequential order.

It is a further object of the invention to provide methods and apparatus for determining when all of the data blocks in a set of tracks have been read, permitting the optical pickup to be moved to read a new set of tracks.

It is also an object of the present invention to provide methods and apparatus for determining whether a set of tracks of an optical disk contains a desired data block.

These and other objects of the present invention are achieved by using a microcontroller programmed to run a read process that buffers and sequences blocks of data read from an optical disk, and an output process that provides the blocks of data to the host computer in sequential order, as required blocks become available. A memory management process manages the buffer memory, while a servo handler process controls movement of the optical pickup and a command handler process handles commands received from the host computer.

In a preferred embodiment, the read process maintains a database of data structures in the buffer memory. A "rotation" data structure identifies the storage locations in the buffer memory for data for all of the tracks that are simultaneously read for at least one rotation of the optical disk. Each rotation structure is assigned multiple "channel" data structures, with each channel structure identifying the storage locations for all of the data blocks from a single track (channel). The rotation and channel memory structures may identify the storage locations for example, by pointers, or may correspond to physical allocations of storage within the memory buffer.

When a new data block from a typical spiral-track disk is read by one of the beams of a multi-beam optical disk reader, a block ID number associated with the data block is examined to determine whether the received block has an ID number that is one less than the ID number of the first block of the next channel. If so, then the last block of the channel for which the block was received is linked to the first block of the next channel, and the channel in which the block was received is deemed "closed."

When all of the channels of a rotation are closed, the rotation is deemed closed. The read process may then send a message to the process that handles movement of the optical pickup requesting that the optical pickup be moved to read the next set of tracks. In addition, the last data block of the last channel of the closed rotation may be linked to a data block in the new rotation. This linking of data blocks, channels, and rotations creates a sequential chain of blocks that is used by the output process to provide blocks to the host computer in sequential order.

In addition to handling a regular flow of data blocks from each of the tracks that are being simultaneously read, the read process also is able to handle a variety of error conditions, including invalid or missing block ID numbers, the inability to read data in one or more of the channels, missing blocks, and other errors that cause the system to be unable to close one or more of the channel structures.

The read process also determines whether a desired data block is within the range of blocks that will be read by the current rotation. In a preferred embodiment, this is achieved by determining whether the ID number of the desired block is between the ID numbers of the first block of the first channel in the current rotation and the first block of the last channel in the rotation. If so, then the block is within the range that will be read in the current rotation. Alternative embodiments determine the range based on estimates of the ID numbers of the first and last blocks of a rotation based on the radial position of the optical pickup.

The output process keeps track of which data blocks must be sent to the host computer. When a needed data block becomes available in the database, the output process places it in a queue of blocks to be sent to the host. After a block, channel, or rotation is sent to the host, the output process sends a message to the memory management process, requesting that it free the memory used by the block, channel, or rotation, thereby permitting the memory to be reused.

BRIEF DESCRIPTION OF THE DRAWINGS

Further features of the invention, its nature and various advantages will be more apparent from the accompanying drawings and the following detailed description of the preferred embodiments, in which.

DETAILED DESCRIPTION OF THE INVENTION

The description of the present invention provided herein is organized as follows: first, a multi-beam optical pickup suitable for use with the apparatus and methods of the present invention is described. Next, a high-level state diagram showing the processes used to implement a preferred embodiment of the methods of the present invention is described in detail. Finally, the buffering and sequential reordering methods of the present invention are described with reference to a preferred embodiment, and illustrative examples are provided.

Figure 1:
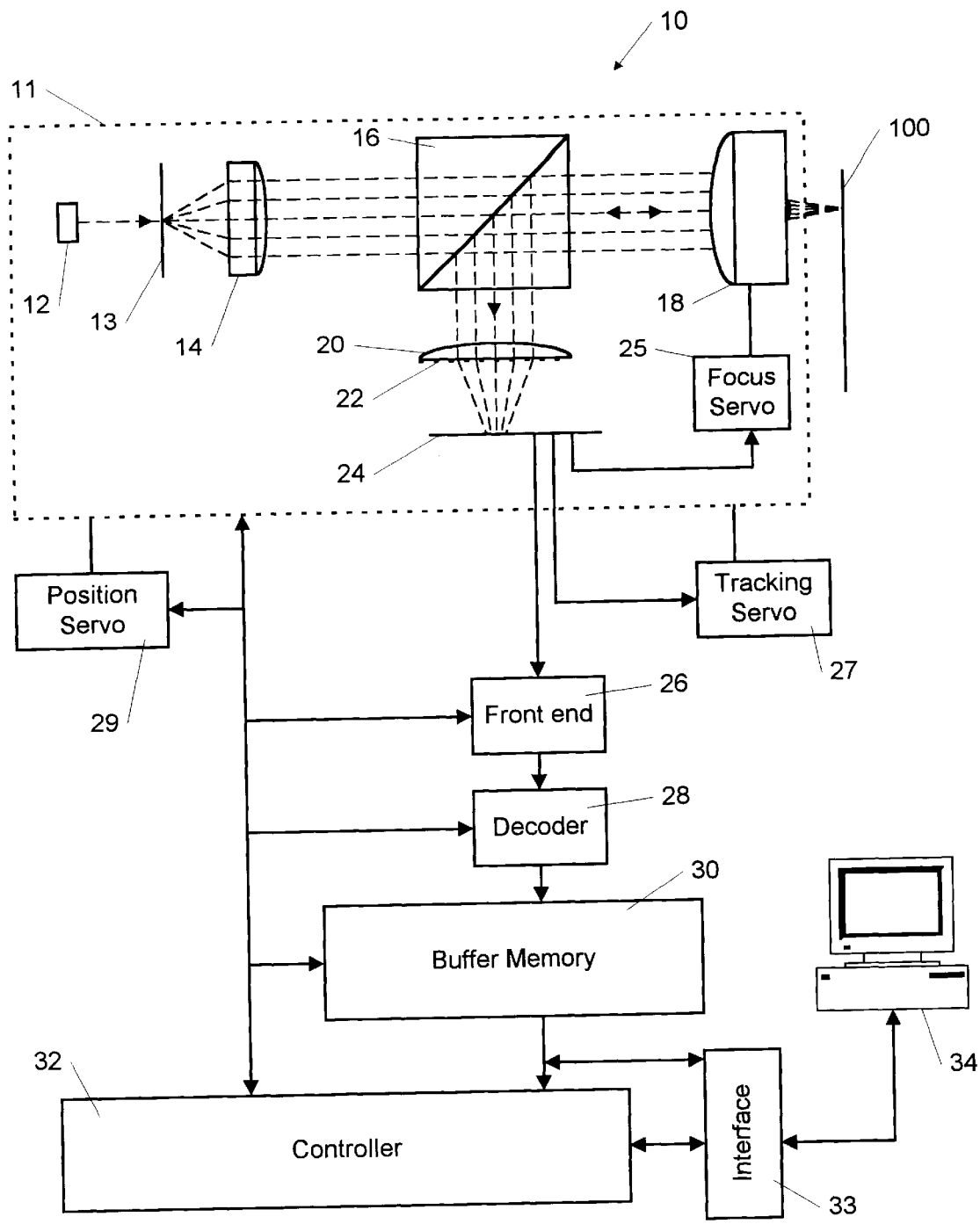
FIG. 1 is a block diagram of a multi-beam optical disk reader system suitable for use with the methods and apparatus of the present invention.

FIG. 1 shows multi-beam optical reader 10, that uses a diffractive element to generate multiple reading beams. Multi-beam optical pickup 11 includes laser diode 12, which generates an illumination beam that is split into a plurality of reading beams when it passes through diffractive element 13. The reading beams then pass through collimator 14, and beamsplitter 16, and are directed toward objective lens 18, which focusses the beams onto a surface of optical disk 100. The plurality of reading beams are reflected from the data-bearing surface of optical disk 100, modulated by the data recorded on a plurality of tracks of optical disk 100. The reflected, modulated beams again pass through objective 18, and beamsplitter 16, that directs the beams through detector lens 20 and holographic element 22 onto detector array 24. Alternatively, multiple reading beams may be generated by individual laser diodes, in which case diffractive element 13 may be omitted. Generally, the reading beams may be generated by a combination of one or more laser diodes and one or more diffractive elements. The methods and apparatus of the present invention could also be used with an optical disk reader that uses a wide-area beam to simultaneously read multiple tracks of an optical disk.

Detector array 24 comprises a plurality of photo-detector elements, that produce signals representing data stored in multiple tracks of the optical disk. Signals produced by detector array 24 also may be used to drive focus servo 25, to move objective lens 18 to correct focus errors, and to drive tracking servo 27 to correct for tracking errors. Position servo 29 moves optical pickup 11 to a position over a desired set of tracks, responsive to commands from controller 32.

Detector array 24 generates a signal for each of the reading beams, and sends the signals to front end circuitry 26. Front end circuitry 26 recovers a serial stream of bits from the signal for each of the tracks being read, and synchronizes each of the streams of bits to generate multi-bit data words.

The data words from front end circuitry 26 are sent to decoder 28, which decodes and error corrects the data, and assembles the data into data blocks. This decoding process varies according to the format of the disk. For example, for the CD-ROM format, the decoding process includes eight-to-fourteen demodulation (EFM), Cross Interleaved Reed-Solomon decoding (CIRC), error correction, and reading of subcode information, which may include data block ID number (in the header or in the "Q-channel" subcode information). As will be evident to one skilled in the art, decoding may be performed by dedicated circuitry, or by a microprocessor programmed to perform the various steps of the decoding process. Also, parts of the decoding and error correction can be done later in the reading process, such as when the data blocks are sent to host computer 34.

The stream of data blocks produced by one of the reading beams is referred to hereinafter as a channel. Data blocks from all of the channels are queued by decoder 28 for storage in buffer memory 30, which stores the data blocks until they are sent to host computer 34.

The foregoing process is controlled by controller 32, responsive to commands received from host computer 34. Controller 32 in turn issues commands to position servo 29, front-end circuitry 26, decoder 28, buffer memory 30, and optical pickup 11. The present invention relates to the operation of controller 32, and specifically provides methods and apparatus for controlling buffer memory 30 so that data that are received from multiple channels may be stored, and reordered as necessary into a sequential order for transfer to host computer 34. To the extent that reading a stream of data blocks requires movement of multi-beam optical pickup assembly 11, methods for controlling position servo 29 are also included. Additionally, the apparatus and methods of the present invention provide for receiving read commands from host computer 34, and sending data to host computer 34 through interface 33.

Controller 32 may comprise a general purpose microprocessor that has been programmed to perform the functions described hereinafter, or alternatively, may comprise special purpose circuitry. It will be apparent to one skilled in the art that embodiments also may be constructed in which the functions of front end circuitry 26 and/or decoder 28 are performed by controller 32.

It will further be understood by one skilled in the art that as well as performing the methods of the present invention, controller 32 also may perform other operations, such as power control, control of seek operations, and other well-known functions required by a typical optical disk reader.

Figure 2:
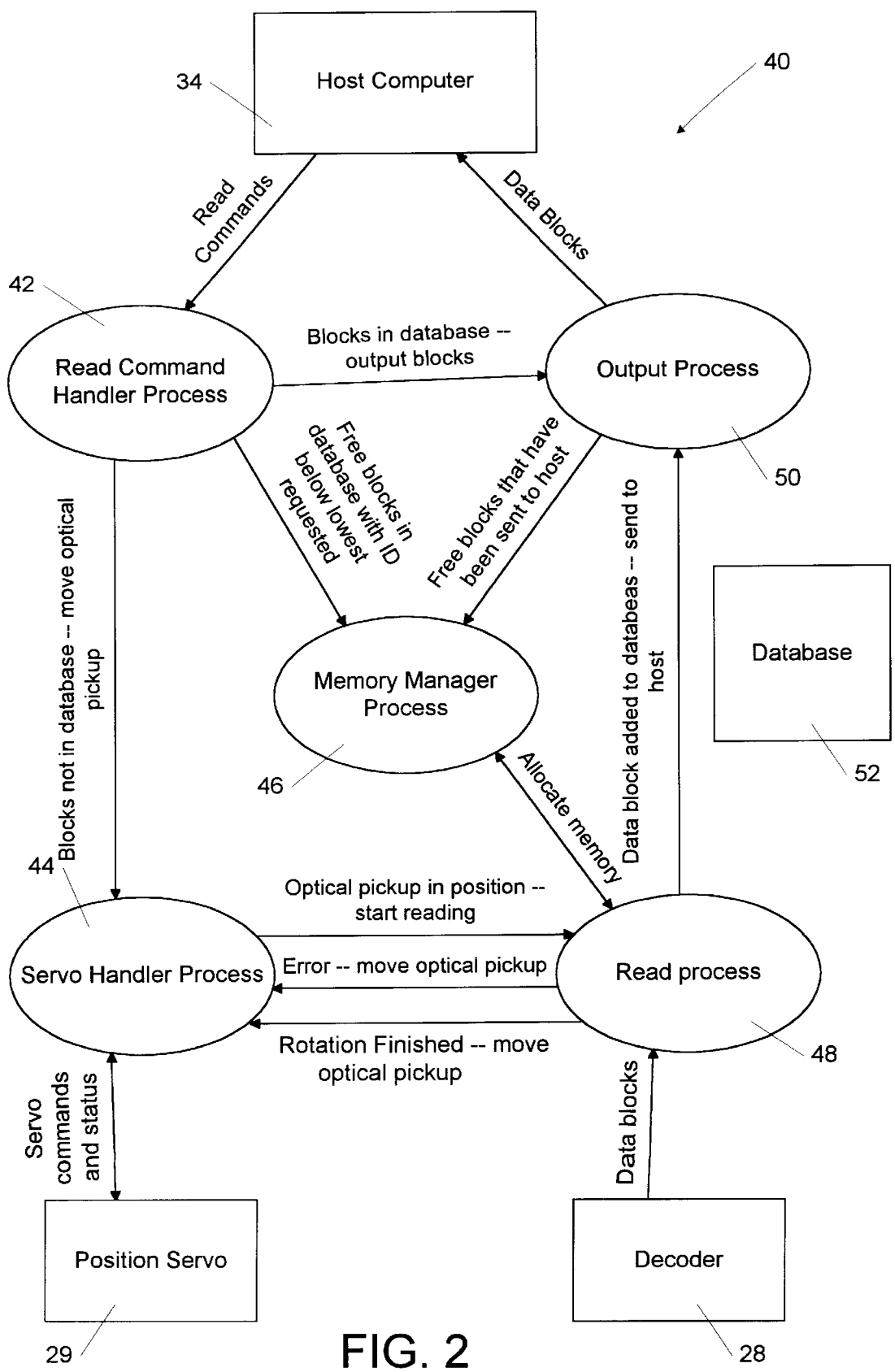
FIG. 2 is a high level state diagram showing a set of processes implementing an embodiment of the methods of the present invention.

FIG. 2 shows a high-level state diagram of a preferred embodiment of the methods of the present invention. These methods may be implemented through use of dedicated circuitry, or preferably as a program stored in a non-volatile memory within controller 32 of FIG. 1, instructing controller 32 to run the various processes described with reference to FIG. 2 to handle storage of data blocks within a database in buffer memory 30.

Optical disk reader control program 40 includes read command handler process 42, servo handler process 44, memory manager process 46, read process 48, and output process 50. All of these processes access database 52, stored in buffer memory 30, which contains data blocks received from decoder 28.

Read command handler process 42 accepts read commands from host computer 34, and determines what actions to take responsive to those commands. For example, when host computer 34 sends a read command requesting a range of sequential data blocks, read handler process 42 adds that range of blocks to a list of pending read commands. Read command handler process 42 then initiates output process 50, which checks in database 52 to see if the requested blocks are present. If any of the requested blocks are not present in database 52, a message is sent to servo handler process 44 to move the optical pickup to a location where the required data blocks may be read, and to initiate reading of the data blocks.

Preferably, read command handler process 42 also sends a message to memory manager process 46 indicating that memory in the database containing data blocks having ID numbers below the ID number of the lowest requested data block may be freed. This space may be re-allocated because blocks typically are requested in increasing sequential order. It therefore is unlikely that data blocks lower than the lowest data block requested in a read command will be needed soon after the requested data blocks.

Servo handler process 44 keeps track of the position of multi-beam optical pickup 11, and instructs position servo 29 to move multi-beam optical pickup 11 when requested. Read command handler process 42 and read process 48 send messages to servo handler process 44 requesting that it move the optical pickup to permit reading of desired data blocks. On receiving such a message, servo handler process 44 sends commands to position servo 29 to move the optical pickup. Once the optical pickup is correctly positioned over the desired tracks, servo handler process 44 sends a message to read process 48, indicating that the optical pickup is in position, and that reading may be commenced (or resumed).

Servo handler process 44 is preferably optimized to handle track jumps of a fixed size, depending on the number of tracks that may be simultaneously read. When reading a continuous sequence of blocks on an optical disk on which data are arranged along a single spiral, it is desirable to be able to quickly jump by (n−2) tracks after each rotation of the disk, where n is the number of tracks that are simultaneously read. A jump of this size provides one track of overlap between rotations, and accounts for the fact that tracking the spiral for a complete rotation automatically advances the position of the optical pickup by one track. For example, the servo handler process for an optical reader that reads seven tracks simultaneously would preferably be optimized to perform jumps of five tracks.

Memory manager process 46 allocates and frees memory in database 52. Messages requesting allocation of memory in which to store data blocks are received from read process 48. In response to these messages, memory manager process 46 finds free memory, or memory that has been marked as "freeable", in database 52, allocates the memory, and sends read process 48 a message indicating the location of the memory allocated for storing data blocks. If memory manager process 46 is unable to find enough free memory in database 52, it may be able create free memory by removing data from database 52. Preferably, the least recently used data will be removed first. If no memory may be freed, a message indicating that no memory is available may be sent to read process 48. Such an event can occur when requested blocks that have already been read are not yet delivered to host computer 34.

Messages informing memory manager process 46 that memory may be freed (because the data has been output to host computer 34) are received from output process 50. Preferably, memory manager process 46 also receives messages from read command process 42 indicating that memory in database 52 may be freed, as described above. When these messages are received, the indicated memory is marked as "freeable", and may be re-allocated when needed.

Preferably, database 52 is organized into data structures called "rotations" and "channels". As used herein, data structures may refer to any logical schema by which data are organized, including tables of pointers that identify storage locations of actual blocks of data stored elsewhere in buffer memory, as well as physical locations in the buffer memory that store the data.

Each rotation structure identifies data blocks read during one complete rotation of the disk, and has associated with it multiple channel structures. Each channel structure, in turn, is associated with one channel of data (i.e. for each track of the optical disk that is simultaneously being read). Each channel structure identifies data blocks arriving from one of the channels. In a preferred embodiment, memory manager process 46 allocates and frees memory for an entire rotation structure at once. Alternatively, memory may be allocated and deallocated for individual channels or individual data blocks, rather than for an entire rotation structure.

Read process 48 performs the core functions of the present invention by receiving information on incoming data blocks from decoder 28, and storing the data blocks in database 52. Read process 48 links data blocks in database 52 to reorder the data blocks sequentially. Read process 48 also compensates for certain errors encountered while reading data blocks, for example, by automatically correcting missing block ID numbers, or by rereading data blocks using a different channel (i.e. a different beam of the multi-beam optical pickup). In a preferred embodiment, read process 48 handles pointers to the locations of data blocks, while the transfer of the data contained in the data blocks is handled by hardware.

When a new data block arrives on any channel from decoder 28, read process 48 stores the block in database 52, and reorders the data blocks by linking the new block to previous blocks, forming a sequential chain of blocks, as will be described in greater detail hereinbelow. Additionally, a message may be sent to output process 50 indicating that the data block is in the database, and is available to be sent to host computer 34.

When all of the data blocks for an entire rotation have been read, a message is sent to servo handler process 44 indicating that it should do a track jump, after which reading may be resumed. Read process 48 also may send messages to servo handler process 44 when errors requiring movement of the optical pickup are encountered.

Read process 48 also sends messages to memory manager process 46 requesting that memory be allocated, and receives messages indicating the location of allocated memory. Alternatively, An error condition is returned if no memory can be allocated in database 52. In a preferred embodiment, read process 48 reads ahead even when no command is pending, by continuing to read and link data blocks until database 52 is full, and no more memory in database 52 can be allocated. When this occurs, read process 48 is suspended until memory in database 52 becomes available, due to data blocks being sent to host computer 34 by output process 50, or due to a new read command being received by read command handler process 42.

Output process 50 sends data blocks to the host computer in sequential order to fulfill read commands. If a read command is pending, output process 50 will receive messages from read process 48 indicating that a block has been added to database 52. Output process 50 will then check the data blocks available in database 52 against the currently pending read command, and if the blocks being sent are within the range of the pending read command, send as many sequential data blocks as possible from database 52 to host computer 34. Output process 50 then sends a message to memory manager process 46 indicating that memory from data blocks in database 52 that have been sent to host computer 34 may be marked as freeable.

It will be evident to one skilled in the art that there are many minor variations on the above-described processes and the communications between them that may be made without departing from the present invention. It will further be evident that the above-described processes may be implemented in software either as procedures or functions in a program, as coroutines, as separate threads of execution in a multithreaded system, or as separate tasks in a multitasking system. Messages may be sent between the processes through a variety of mechanisms, including a messaging system, interrupts, procedure or function calls, and shared memory (including shared variables, flags, databases, or other data structures). It will further be understood that the rotation and channel structures may be implemented as arrays, tables, tables of pointers, linked lists, graph structures, or any other known data structure that is capable of representing an ordering of data blocks.

Figure 3A:
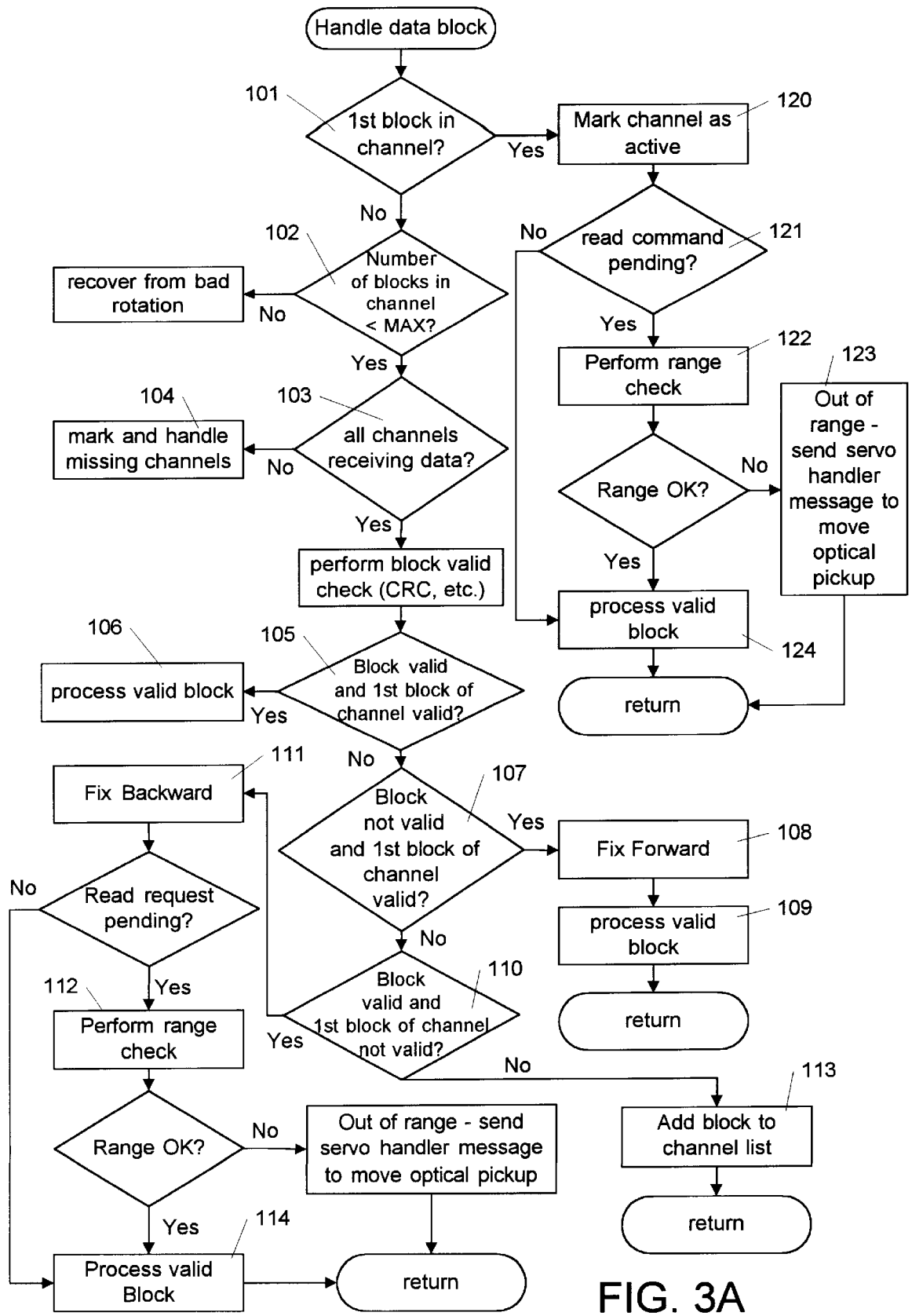
FIGS. 3A–E are flow charts of a preferred embodiment of the read process of the present invention.

Referring now to FIGS. 3A–E, high-level flowcharts of the operation of a preferred embodiment of read process 48 are shown. The process illustrated in the flowchart of FIG. 3A is invoked whenever a data block (from any channel) arrives from decoder 28. In this embodiment, it is assumed that memory manager process 46 has already allocated a rotation structure that has a channel structure for each channel of data.

At step 101, the system checks to see if the data block is the first data block for its channel. If so, the channel is marked as active (step 120), and a range check is performed (step 122) if a read command is pending (step 121). The range check (described hereinafter with reference to FIG. 3B) insures that the optical pickup is correctly positioned by confirming that a requested data block is within the range of blocks to be read in the current rotation. If not, the optical pickup is moved so that a requested data block is within the range of this rotation (step 123). If the optical pickup is correctly positioned, the block is processed by a routine described below with reference to FIGS. 4A–B (step 124).

At step 102, the system checks whether the number of blocks currently in the channel structure for the channel from which the block arrived is less than a maximum number of blocks for a channel. If not, then the maximum has been reached, indicating that this rotation is bad (i.e. the rotation cannot be closed—see FIGS. 4A–B, below), and it is necessary to recover from a bad rotation. The maximum number of blocks for a channel varies as a function of the radial position of the optical pickup. For simplicity, a preferred embodiment for reading the CD-ROM format uses 30 as a fixed maximum number of blocks in a channel. Alternatively, a timer may be used to determine whether too much time has elapsed since the time the first block arrived in the current rotation, thus indicating a need to recover from a bad rotation.

At step 103, the system checks whether any of the channels are not receiving data. In a preferred embodiment, this check consists of determining whether any channels have received no data when at least one other channel has received three or more data blocks. If so, those channels that have received no data are marked as "missing channels", and the system attempts to recover the missing channels (step 104) by re-reading them, or by moving the optical pickup and reading them on a different channel. This determination also may be made using a timer, by making certain that all channels have received at least one block within a specified time from the arrival of the first block of the rotation.

If no channels are missing, the system checks whether correction of data block ID numbers should be performed. If the ID number of the current block is valid, and the first block of the current channel is valid (step 105), then no correction is needed, and the system processes the block (step 106). If the ID number of the current block is not valid and the first block of the channel is valid (step 107), then the system corrects the current block ID number using a "fix forward" method (step 108), as described below, and processes the block (step 109). If the current block ID number is valid and the ID number of the first block in the channel is not valid (step 110), then the system corrects the ID numbers of prior blocks in the channel using a "fix backward" method (step 111), as described below. Since this method provides an ID number for the first block in the channel, if there is a pending read command, a range check (identical to the range check of step 122) is performed (step 112). If the required blocks are in range, or no range check is needed, the current block is processed (step 114).

If all of the tests of steps 105, 107, and 110 fail (i.e. the current block ID is invalid and the first block of the channel has an invalid ID number), then the current block is simply inserted at the end of the list of blocks associated with the channel on which the block arrived (step 113), and the read process waits for the next event (data block or message) to occur.

Figure 3B:
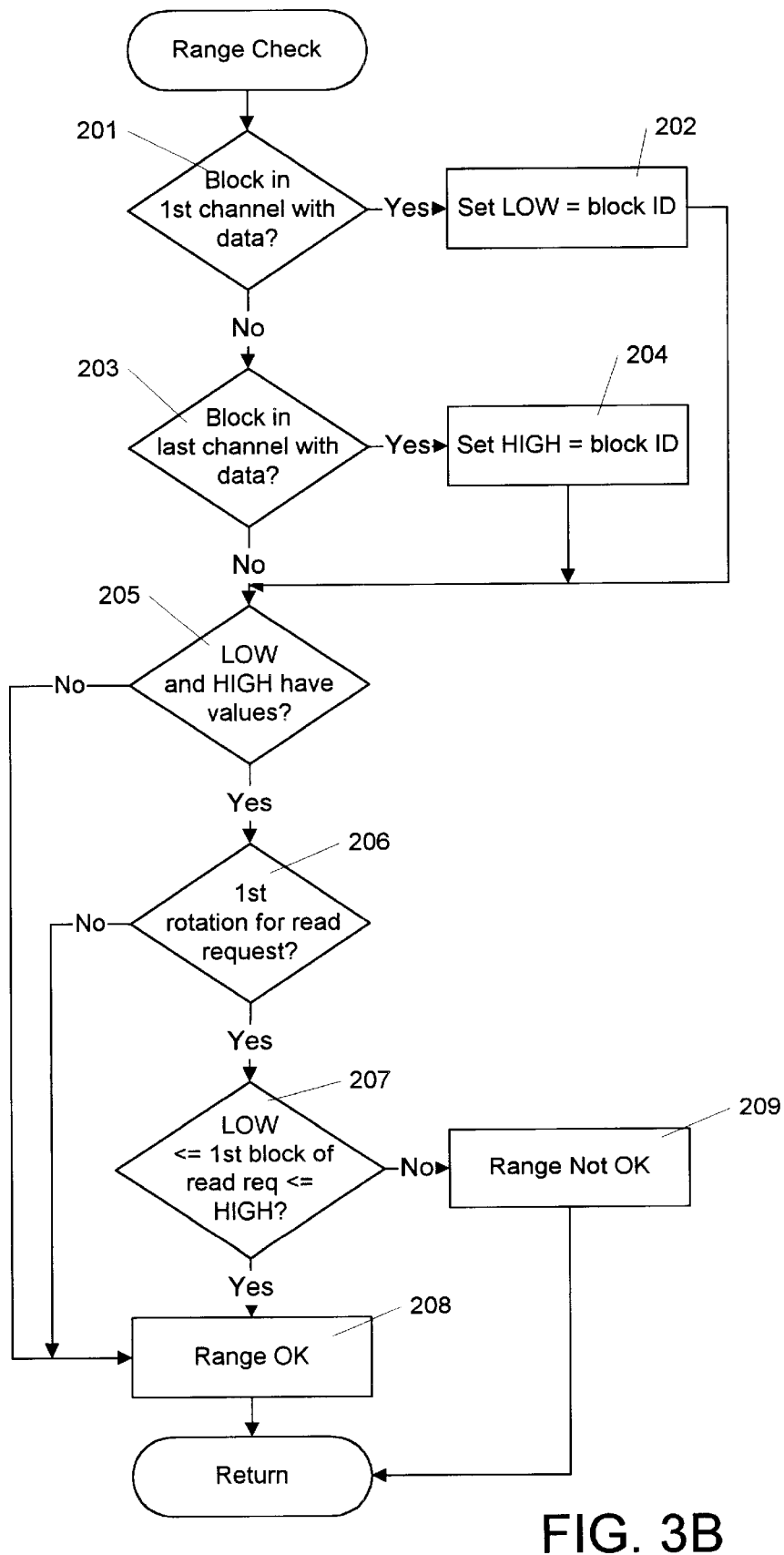

Referring now to FIG. 3B, a flowchart of a preferred procedure for checking the range of blocks to be read in a given rotation, for example, at steps 122 or 112 of FIG. 3A, is described.

At step 201, the system checks whether the first channel with data is the channel currently being processed. If so, the low end of the range is set to the block ID of the first block in the channel (step 202). If not, the system checks whether the last channel with data is the channel currently being processed (step 203). If so, then the high end of the range is set to the block ID of the last block in the channel (step 204).

If both the low and high ends of the range for the rotation exist (step 205), and this is the first rotation that is being processed for a read command (step 206), the system checks that the first block requested by the read command is between the low and high ends of the range (step 207). If so, then the range is valid (step 208). If not, the rotation is not in the proper range (step 209), and must be corrected.

Figure 3C:
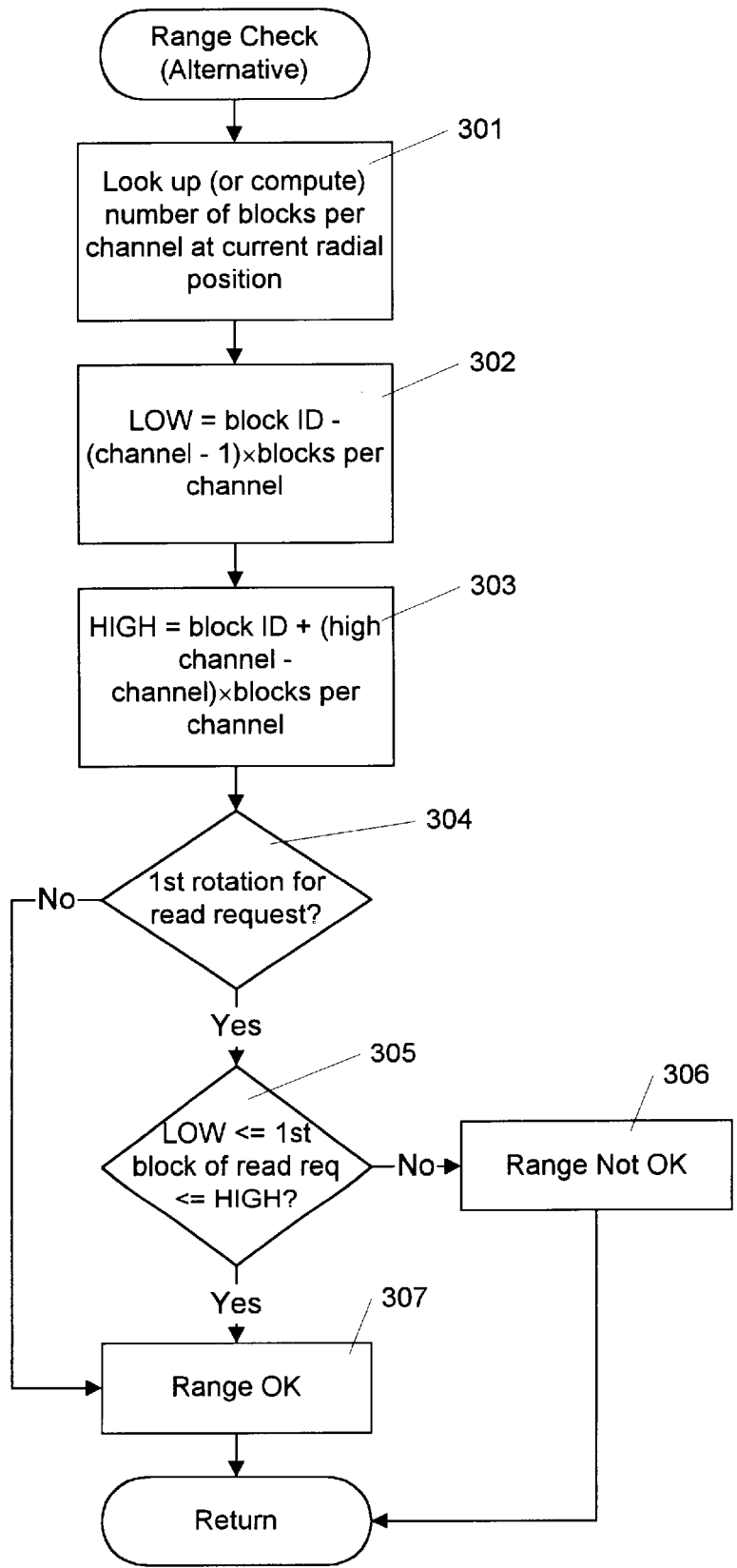

Alternatively, other methods may be used to check the range of a rotation. FIG. 3C illustrates one such method, where it is assumed that the block being processed in the range check is the first block in a channel. More specifically, at step 301, a table lookup is performed based on the current radial position of the optical pickup to determine an average number of blocks expected for each channel. This value varies with radial position on the disk, and is lowest near the center of the disk. Alternatively, the average number of blocks per channel could be computed, rather than looked up in a table. The minimum number of blocks per channel could also be used, rather than the average number of blocks per channel.

At step 302, the block ID of the lowest block in the current rotation is computed by multiplying the average number of blocks per channel by the current channel minus one, and subtracting the result from the block ID of the current block. Step 303 computes the highest block for the current rotation by multiplying the average number of blocks per channel by the highest channel number minus the current channel number, and adding the result to the current block ID.

Once the lowest and highest blocks of the rotation are computed, the system checks whether the current rotation is the first rotation of the currently pending read command (step 304). If so, the system checks that the lowest requested block of the currently pending read command is between the lowest and highest blocks of the rotation (step 305). If not, the rotation is out of range (step 306), and should be corrected. Otherwise, the rotation is in range (step 307).

Advantageously, the method of checking the range of FIG. 3C requires only that the first block of any channel to be read before the range check may be performed. By contrast, the method described with reference to FIG. 3B requires that the first block of the first and last channels be read before a range check can be performed. It will be evident to one skilled in the art that in addition to the methods described above, a hybrid method, in which the system waits for the first block of the first channel, and estimates the last block of the last channel could be used.

Figures 3D, 3E:
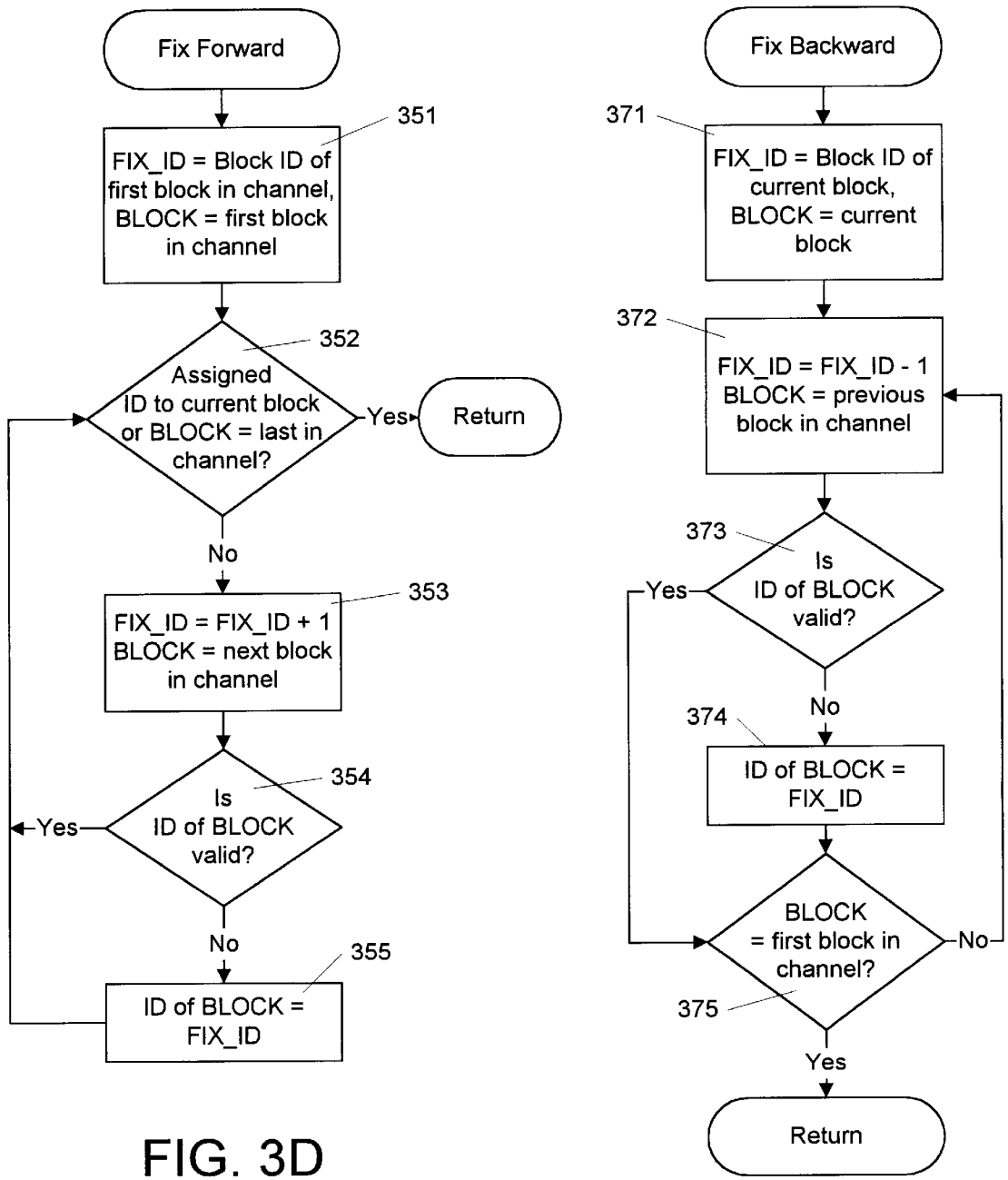

Referring now to FIG. 3D, a flowchart of the process of correcting data block ID numbers in a forward direction (step 108 of FIG. 3A) is described. This process assumes that, within a channel, blocks arrive in sequential order. Thus, if the ID number of the first data block of a channel is known, ID numbers for subsequent blocks in that channel can be derived by simply adding one to the ID number for each block in the channel. The fix forward routine is invoked when the ID number of the first data block of a channel is known and the ID number of a subsequent data block is bad.

Thus, step 351 of the fix forward routine sets a BLOCK pointer to point to the first block of a channel, and a FIX_ID counter to the data block ID number of the first block of the channel. At step 352, the routine checks whether it has corrected the current block already, or if it has checked the last block in the channel (i.e. the BLOCK pointer points to the last block in the channel). If so, the fix forward routine is finished for this channel, and may exit. Otherwise, the FIX_ID counter is incremented, and the BLOCK pointer is adjusted to point to the next block in the channel (step 353).

The data block ID number of the block pointed to by the BLOCK pointer is then tested to see if it is valid (step 354). If not, at step 355 the data block ID number is corrected by assigning it the value of the FIX_ID counter, which should contain the correct data block ID number for this block. The fix forward routine then jumps back to step 352, either continuing with the next block in the channel, or exiting the routine.

FIG. 3E shows a routine for fixing block IDs in a backward direction (step 111 in FIG. 3A). Like the fix forward routine, the fix backward routine assumes that blocks in a channel arrive in sequential order. The fix backward routine is called in cases where the ID number of the first block in the channel is bad, but the ID number of the current block is known.

At step 371, the fix backward routine sets the FIX_ID counter to the value of the data block ID number of the current block. At step 372, the FIX_ID counter is decremented, and the BLOCK pointer is adjusted to point to the previous block in the channel. The routine then checks whether the data block ID number of the block pointed to by the BLOCK pointer is valid (step 373). If not, the ID number is corrected by assigning it the value of the FIX_ID counter, which should contain the correct data block ID number (step 374).

Next, at step 375, the fix backward routine checks whether the BLOCK pointer currently points to the first block in the channel. If so, backward ID number correction is finished, and the routine may exit. Otherwise, the routine jumps back to step 372, and continues correcting block ID numbers.

Figure 4A:
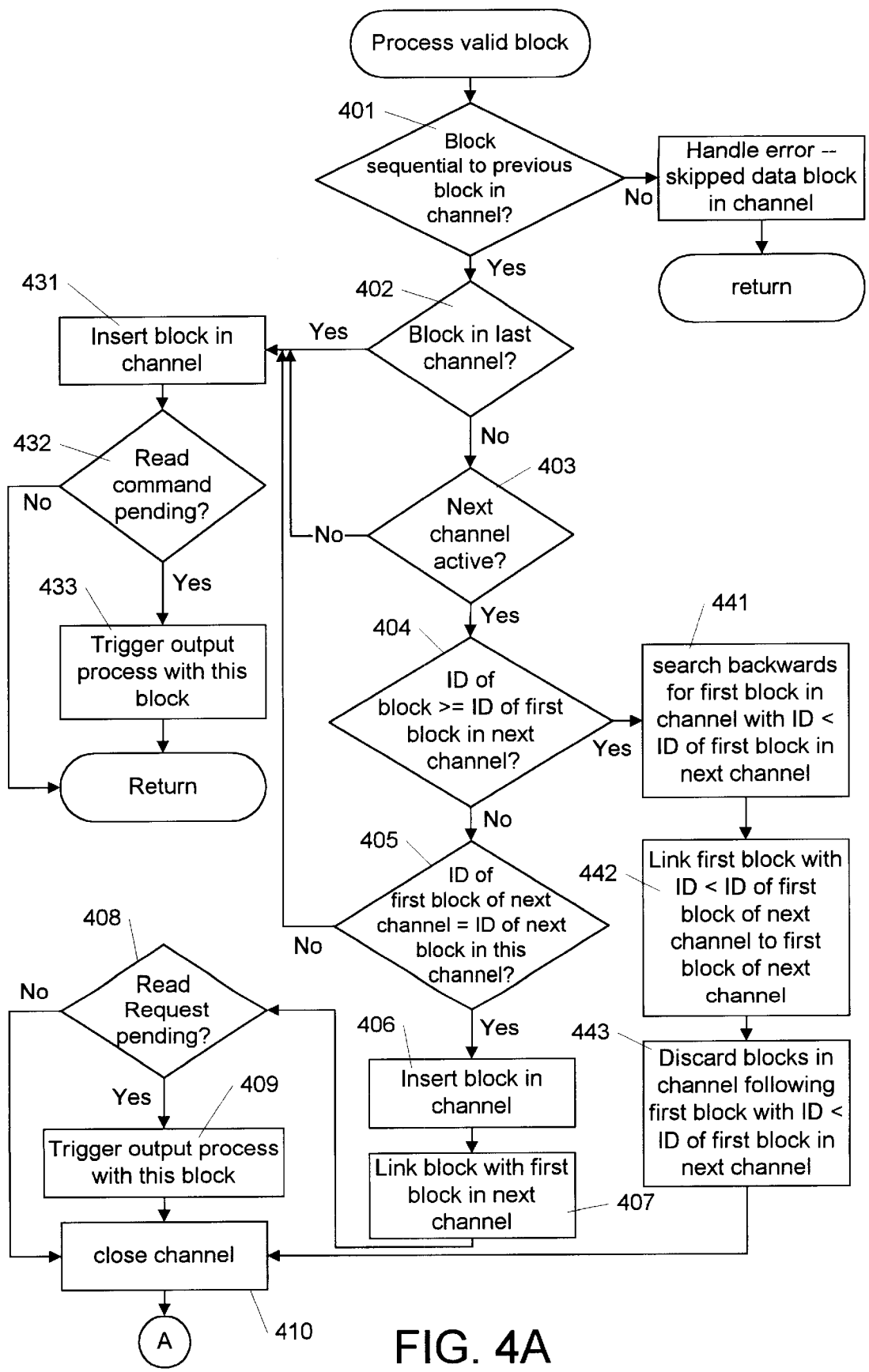
FIGS. 4A–B are flow charts showing a portion of the read process that handles processing of valid data blocks in a preferred embodiment of the present invention.
Figure 4B:
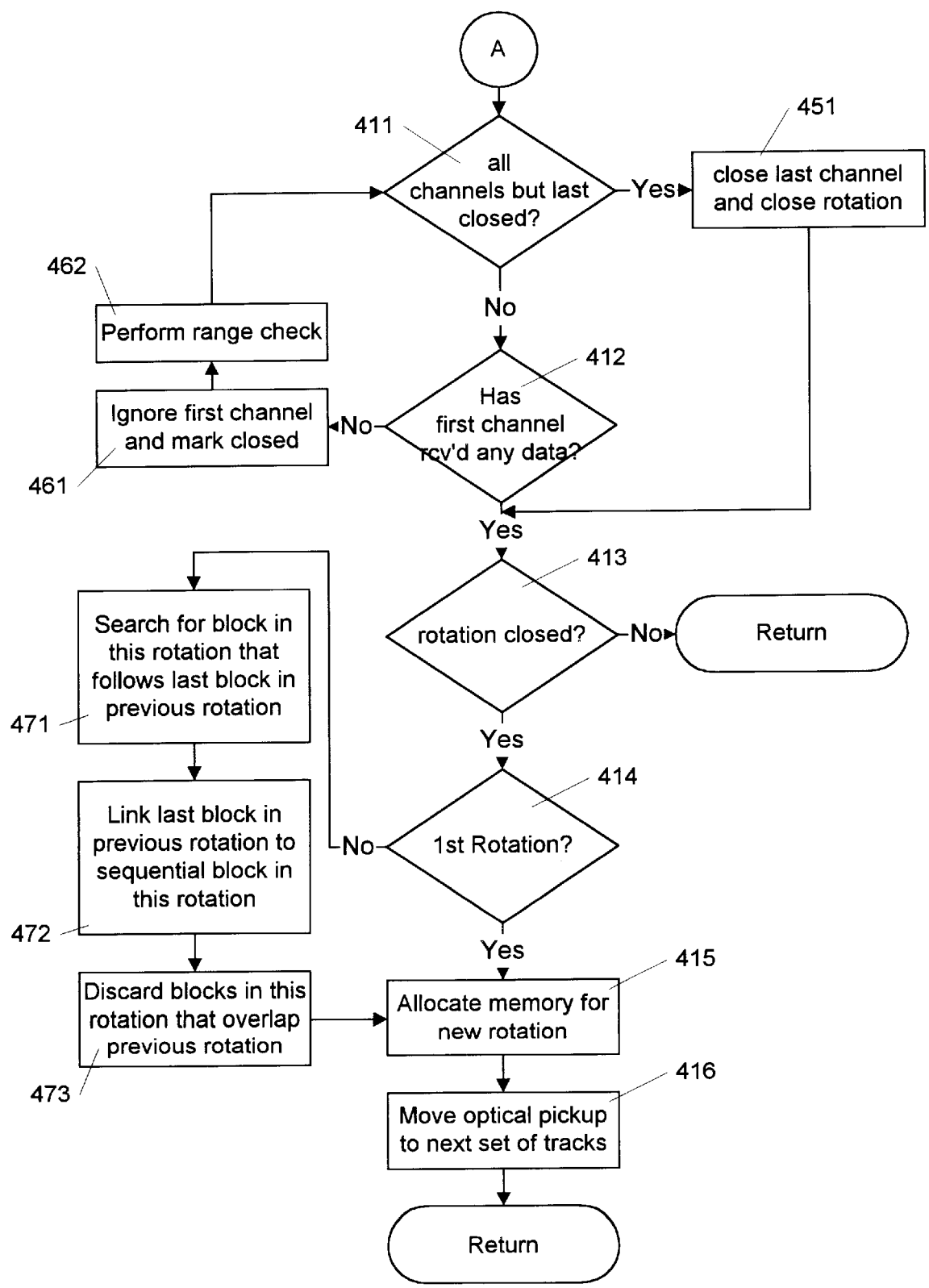

Referring now to FIGS. 4A–B, a flow chart of a routine for processing valid blocks, for example, at steps 106, 109, 114, and 124 of read process 48 of FIG. 3A, is described. This routine places the blocks in the proper sequence in a channel, reorders the data blocks by chaining data blocks together, and determines if a channel may be "closed." A channel may be closed when a block arrives that has an ID number one less than the ID number of the first block in the next channel. Because the last channel has no "next" channel, it is closed when all of the other channels are closed. When all of the channels are closed, the rotation is deemed closed, and the system may jump to the next set of tracks to be simultaneously read.

Referring to FIG. 4A, at step 401, the system checks whether a block being processed has an ID number that is continuous with the ID numbers of previous blocks in the channel from which the block was read. If not, a block has been skipped, and the system can handle this error by moving the optical pickup, or by waiting for one more revolution of the disk, so that the skipped block will be read by a different beam. Next, the system checks whether the block came from the last channel (step 402). If so, because there is no way of linking the block with the first block of a "next" channel, the block is simply inserted at the end of the list of blocks for the last channel (step 431). If a read command is pending (step 432), the output process is informed of the arrival of the block (step 433), so the block may be sent to the host computer if it is part of the read command.

Similarly, if the next channel has received no data blocks (i.e. the channel is inactive), the system is unable to link the current data block to the first block of the next channel. Thus, at step 403, the system checks to see if the next channel is active. If not, the system jumps to step 431, linking the block onto the end of the current channel, as described above.

At step 404 the system checks whether the ID number of the current block is greater than or equal to the ID number of the first block of the next channel. If so, then the channel on which the current block arrived has read too far. It is therefore necessary to search back through the data blocks of the channel for the first data block having a block ID number less than the block ID number of the next channel (step 441). This block is then linked to the first block of the next channel (step 442), and the remaining blocks in the channel are discarded (step 443).

Step 405 tests the ID number of the current block to determine whether it is one less than the ID number of the first block of the next channel. If so, the block is added to the list for the channel in which the block was received (step 406), the block is linked to the first block of the next channel (step 407), and the channel in which the block was received is closed (step 410). Additionally, if there is a read command pending (step 408), the output process is informed that the current block has arrived (step 409).

The procedure for processing a valid data block is continued in FIG. 4B. At step 411, the system checks to see if all the channels but the last are closed. The last channel will never close using the normal means of closing a channel, since there is no next channel, and therefore no ability to check the ID of a block in the last channel against the ID of the first block of the next channel. Thus, if all the channels except the last have been closed, the last channel is deemed to be closed (step 451).

Another special case occurs when all of the channels except the first channel are ready to close, and the first channel is not receiving data. The system checks for this condition at step 412, and can be detected if either all other channels have received many more blocks than the first channel, or if a long time has elapsed since the first channel has received a data block. When this condition is detected, it still may be possible to proceed without the first channel. For most rotations, the first channel will overlap with the last channel of the previous rotation. Thus, if only the first channel is not receiving data, the first channel may be deactivated and closed (step 461). A range check is performed, to make certain that ignoring the first channel will not break the sequential order of the blocks, or cause a requested data block to not be read (step 462).

At step 413, the system checks whether the current rotation is closed. If so, there are several additional steps that are taken. Unless this was the first rotation of a read command (step 414), this rotation is linked to the previous rotation. Because there is an overlap between rotations, the system searches for the data block in the current rotation that follows the last block in the previous rotation (step 471). Once this block is found, the last block of the previous rotation is linked to the block in the current rotation that immediately follows it (step 472). Blocks in the current rotation that overlap blocks in the previous rotation may optionally be discarded, to free memory associated with those blocks (step 473). Alternatively, the linking of rotations can be executed upon the arrival of any block, or the closing of any channel.

Finally, in steps 415 and 416, the system sends messages to memory manager process 46 to allocate memory for the next rotation, and to servo handler process 44 to move the optical pickup to the next set of blocks. When the optical pickup is in position, and data blocks start being read from the next set of tracks of the optical disk, the read process is again invoked.

Figure 5A:
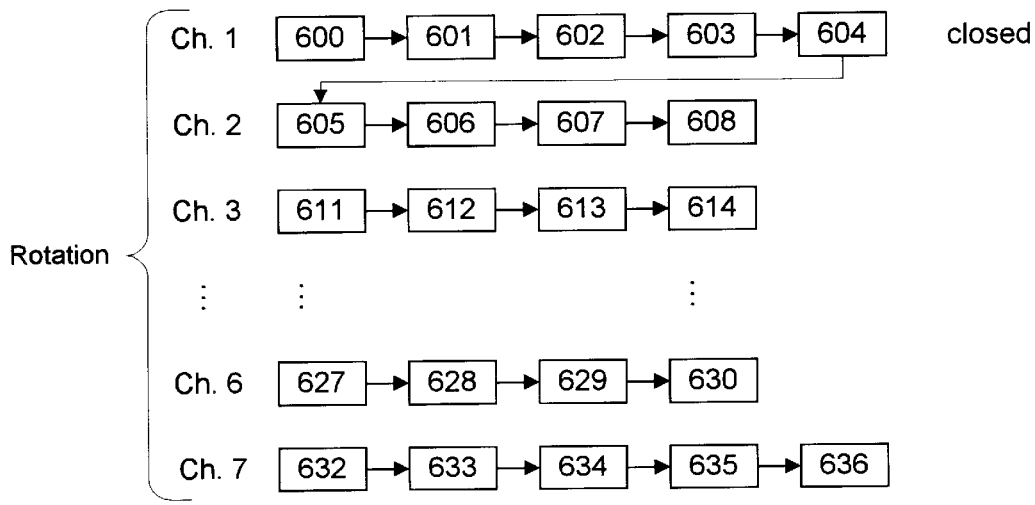
FIGS. 5A–C and 6A–C show examples in which several data blocks are inserted into a rotation, and reordering and correction of data block ID numbers is performed according to the methods of the present invention.
Figure 5B:
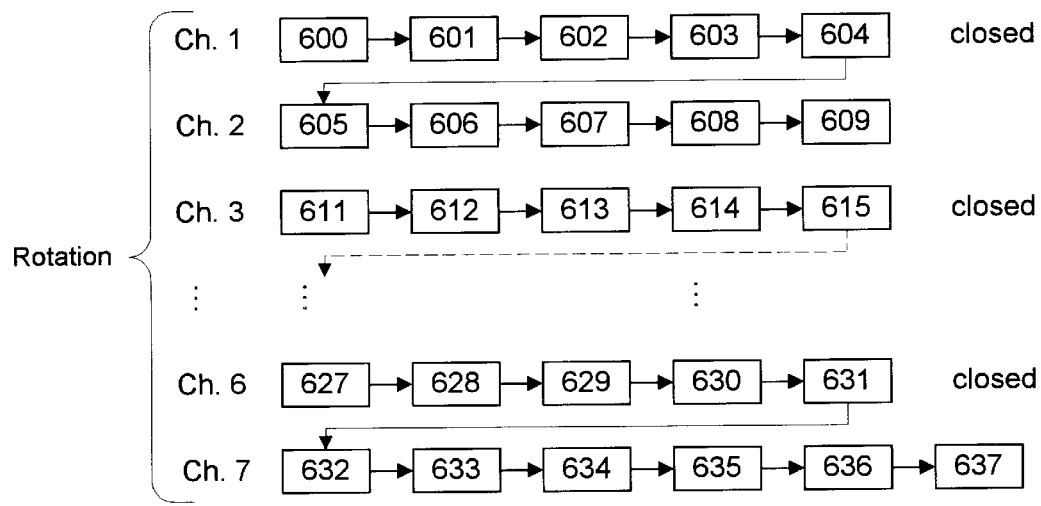
Figure 5C:
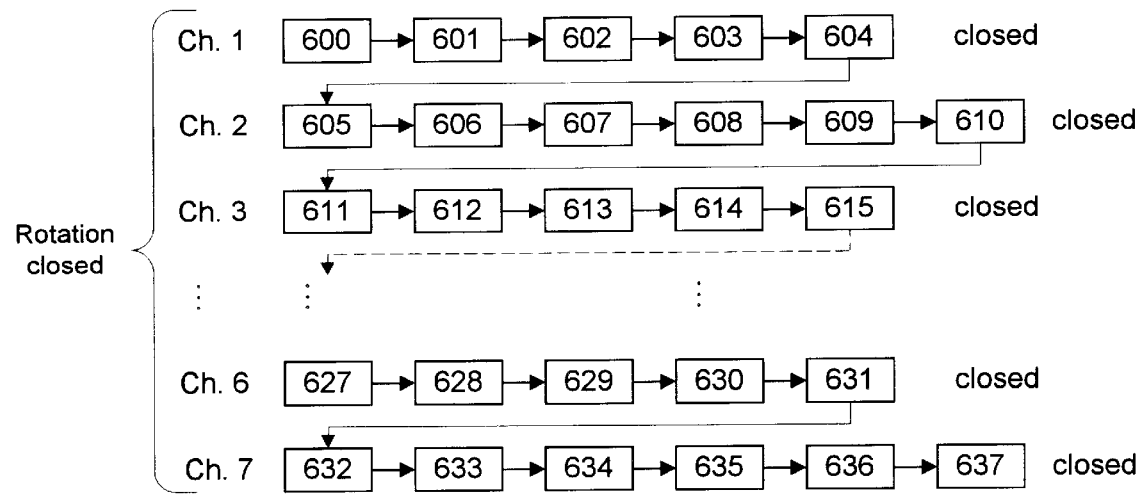

Referring now to FIGS. 5A–C, illustration of operation of read process 48 in reordering data blocks in sequential order is described. FIG. 5A represents the logical structure of database 52 for a rotation having seven channels. Channel 1 is already closed, since its last block (block 604) is linked to the first block of the next channel (block 605), providing a sequential chain from block 600 to block 608. None of the other channels are closed. If a pending read command has requested blocks 606 through 656, and running for 50 blocks, the system would already have sent blocks 606, 607, and 608 to the host computer.

For purposes of illustration, it is assumed that the next blocks arrive in the following order: channel 2, block 609; channel 3, block 615; channel 6, block 631; and channel 7, block 637. FIG. 5B shows the result when these blocks are added to the rotation using the above-described methods. Blocks 615 and 631 close channels 3 and 7, respectively, since in both cases the first block of the next channel (not shown for channel 3) has an ID number one greater than the blocks that arrived. Channel 2 cannot be closed yet, because the first block of channel 3 is block 611, and channel 2 has reached only block 609. Channel 7 may not be closed, because there is no "next" channel with which to link it. Of all the blocks that arrived, only block 609 is sent to the host computer, since it is sequential with block 608, which was previously sent to the host computer.

In FIG. 5C, when block 610 arrives, channel 2 is closed, and a link is made between block 610 in channel 2, and block 611 in channel 3. Assuming that channels 4 and 5 (not shown) also close, channel 7 should be closed, since all of the other channels in the rotation are closed. When all of the channels in the rotation are closed, the rotation is closed, and the system may proceed to the next rotation. Output process 50 may now send blocks 610–637 to the host computer in the required sequential order, and may send a message to memory manager process 46 requesting that it deallocate the space in the database used by this rotation.

Figure 6A:
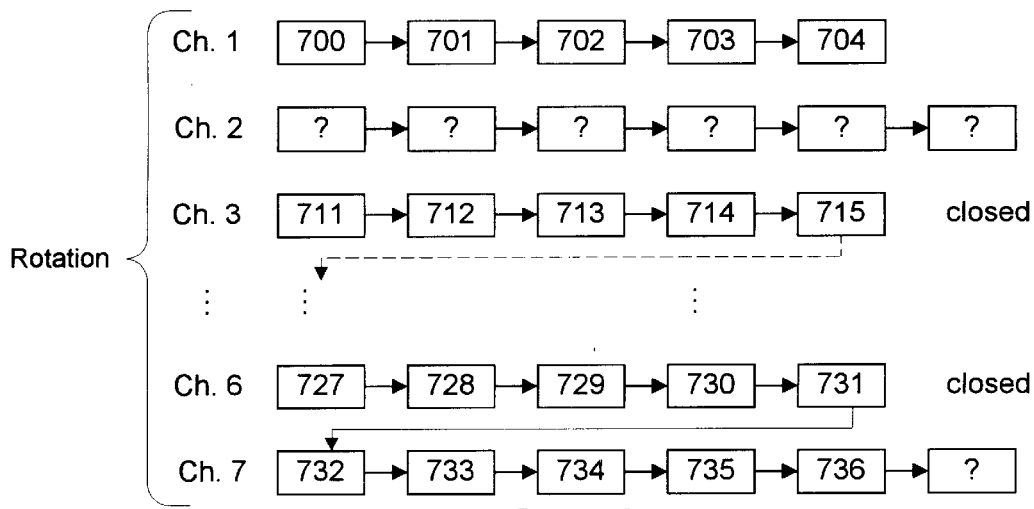
Figure 6B:
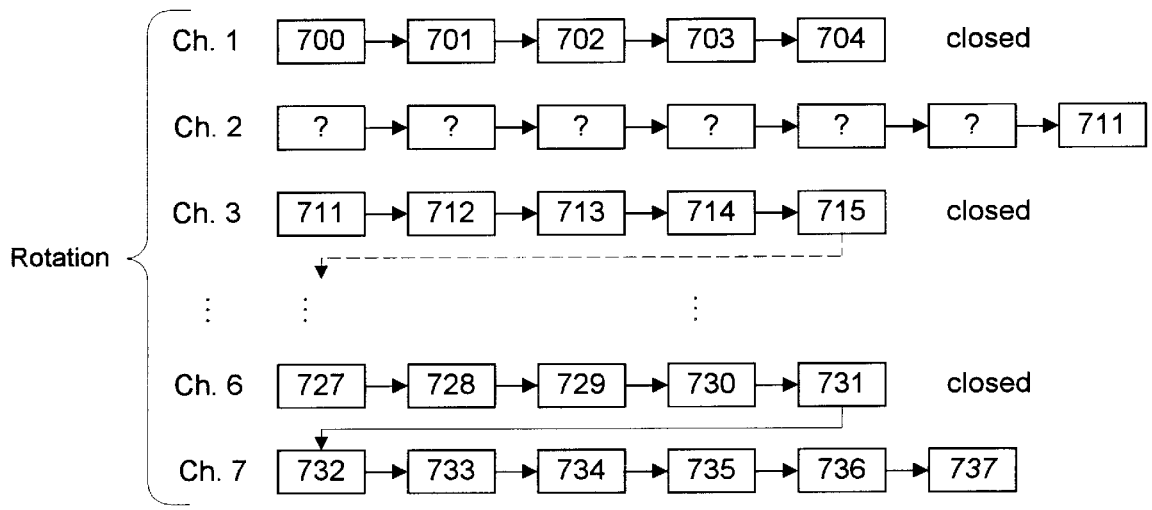
Figure 6C:
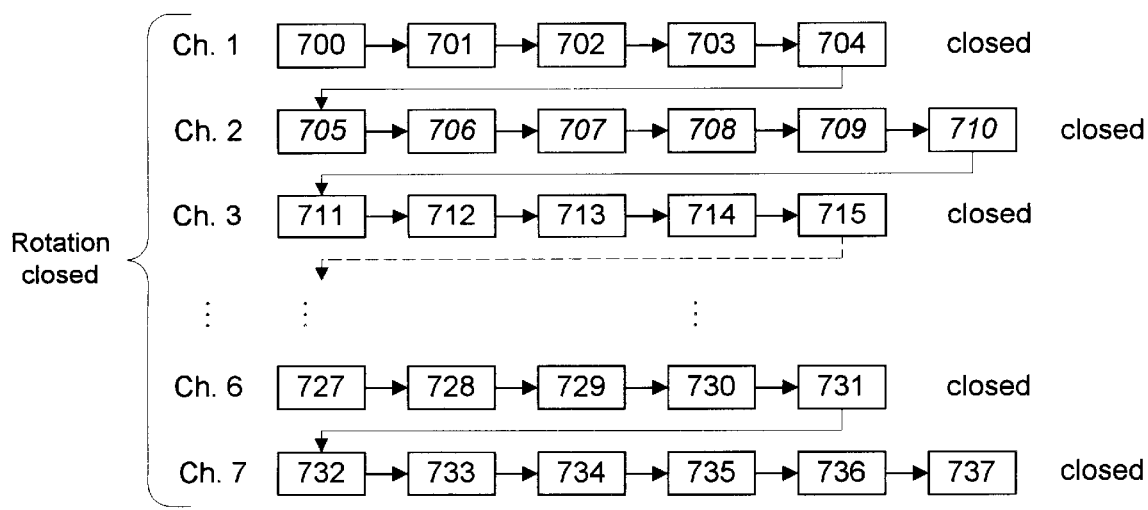

FIGS. 6A–C illustrate an example in which the fix forward and fix backward routines of FIGS. 3D and 3E, respectively, are used to correct data block ID numbers. In FIG. 6A, channels 3 and 6 are closed, and channels 2 and 7 contain blocks having bad ID numbers (shown with ID number "?"). The bad block IDs in channel 2 prevent channels 1 and 2 from closing.

In FIG. 6B, the fix forward routine of FIG. 3D has been run to correct the bad block ID number in channel 7. Because the block with the bad ID immediately follows block 736, the fix forward routine will assign it an ID of 737. Also, as shown in FIG. 6B, block 711 has arrived on channel 2.

FIG. 6C illustrates use of the fix backward routine of FIG. 3E after the arrival of block 711 on channel 2. Starting with the known block ID of 711, the fix backward routine assigns block numbers to blocks 710, 709, 708, 707, 706, and 705. The routine stops with block 705, which is the first block in channel 2. Channel 2 may now be closed, since block 110 precedes block 111, the first block of channel 3. The copy of block 111 in channel 2 may be discarded. Channel 1 may also be closed, since the last block in channel 1 immediately precedes the first block in channel 2. Assuming that channels 4 and 5 (not shown) are closed, channel 7 also is closed. Since all of the channels are closed, the rotation is closed, and the system may proceed to the next set of tracks.

While preferred illustrative embodiments of the present invention are described above, it will be evident to one skilled in the art that various changes and modifications may be made without departing from the invention. It is intended in the appended claims to cover all such changes and modifications that fall within the true spirit and scope of the invention.

What is claimed is:

1. Apparatus for reading a sequential chain of data blocks to a host computer by simultaneously reading multiple data tracks of an optical disk, the apparatus comprising:

an optical pickup that generates a plurality of light beams that impinge on the multiple data tracks, detects modulated light beams reflected from the multiple data tracks, and generates a data signal corresponding to a modulated light beam for each one of the multiple data tracks;

circuitry for converting the data signal for each one of the multiple data tracks into a plurality of channels, each channel containing data blocks for one of the multiple data tracks;

a buffer memory for storing the plurality of channels; and a controller programmed to logically link a data block of a first channel to a first data block of an adjacent channel to generate a sequential chain of data blocks.

2. The apparatus of claim 1 further comprising interface circuitry for receiving read commands from the host computer and sending the sequential chain of data blocks to the host computer.

3. The apparatus of claim 1 wherein the circuitry for converting comprises:

front end circuitry that receives the data signal for each one of the multiple data tracks and generates a stream of bits corresponding to data stored in a respective one of the multiple data tracks, the stream of bits being synchronized and organized into data words; and decoder circuitry that receives the data words from the front end circuitry, organizes the data words into encoded data blocks and decodes the encoded data blocks to provide a plurality of channels.

4. The apparatus of claim 1 further comprising a position servo coupled to the controller that moves the optical pickup relative to a surface of the optical disk, wherein the controller is further programmed to control the position servo to move the optical pickup responsive to read commands received from the host computer.

5. The apparatus of claim 1 wherein the controller comprises a microprocessor.

6. The apparatus of claim 1 wherein the controller is programmed to allocate and deallocate memory space in the buffer memory.

7. The apparatus of claim 1, wherein the buffer memory stores a database identifying the data blocks in the plurality of channels stored in the buffer memory, and the controller further is programmed so that when a read command is received from the host computer, the controller checks the database to determine whether a sequential set of data blocks responding to the read command are present in the buffer memory.

8. The apparatus of claim 6 wherein each data block has a data block ID number and the controller further is programmed so that when a read command is received from the host computer, the controller marks memory space for data blocks in the buffer memory having data block ID numbers lower than a lowest data block ID number requested in the read command as available for reallocation.

9. The apparatus of claim 1 wherein the controller further is programmed so that when a data block is received for one of the plurality of channels, the controller determines whether the data block is the first data block received for that channel; and if so, marks that channel as active and performs a range check.

10. The apparatus of claim 1 wherein each data block has a data block ID number and the controller further is programmed to perform a range check by checking that a first data block requested in a read command has a data block ID number greater than or equal to the data block ID number of a first data block of a first one of the plurality of channels, and less than or equal to the data block ID number of a first data block of a last one of the plurality of channels.

11. The apparatus of claim 1 wherein each data block has a data block ID number and the controller further is programmed to perform a range check by:

computing a lowest data block ID number and a highest data block ID number responsive to a data block ID number of a first data block for any one of the plurality of channels; and checking that a first data block requested in a read command has a data block ID number greater than or equal to the lowest data block ID number and less than or equal to the highest data block ID number.

12. The apparatus of claim 1 wherein the controller further is programmed so that when a data block is received for one of the plurality of channels, the controller:

checks that each one of the plurality of channels is providing data blocks; and marks each one of the plurality of channels that are not providing data blocks.

13. The apparatus of claim 1 wherein each data block has a data block ID number and the controller further is programmed so that when a data block is received for one of the plurality of channels, the controller:

checks that the data block ID number is valid; and if the data block ID number is not valid and a data block ID number of a first data block of that channel is valid, performs a fix forward function.

14. The apparatus of claim 1, wherein each data block has a data block ID number and the controller further is programmed so that when a data block is received for one of the plurality of channels, the controller:

checks that the received data block is valid; and if the data block is valid and a data block ID number of a first data block of that channel is not valid, performs a fix backward function.

15. The apparatus of claim 1 wherein each data block has a data block ID number and the controller logically link a data block of a first channel to a first data block of an adjacent channel by:

checking whether the data block ID number of a data block received in the first channel is one less than the data block ID number of the first data block received in the adjacent channel; and, if so:

creating a link between the data block received in the first channel and the first data block of the adjacent channel and closing the first channel.

16. The apparatus claim 1 wherein each data block has a data block ID number and the controller logically links a data block of a first channel to a first data block of an adjacent channel by:

checking whether the data block ID number of a data block received for the first channel is greater than or equal to the data block ID number of the first data block received for the adjacent channel; and if so:

searching backwards in a list of data blocks received for the first channel for a linkable data block having a data block ID number one less than the data block ID number of the first block received for the adjacent channel;

linking the linkable data block to the first data block of the adjacent channel to provide a sequential chain of the data blocks between the first channel and the adjacent channel;

closing the first channel; and discarding any data blocks for the first channel having data block ID numbers greater than the data block ID number of the linkable data block.

17. The apparatus of claim 1 wherein the buffer memory is organized into rotations, each rotation having memory space identifying storage locations of the data blocks for each one of the plurality of channels for at least one revolution of the optical disk.

18. The apparatus of claim 17 wherein the controller further is programmed to mark a rotation as a bad rotation if a number of data blocks received from any one of the plurality of channels exceeds a predetermined maximum number of data blocks.

19. The apparatus of claim 17 wherein the controller further is programmed to mark a rotation as a bad rotation if any one of the plurality of channels remains in an active state for a period of time longer than a predetermined time limit.

20. The apparatus of claim 17, wherein the controller is programmed to:

check whether all of the plurality of channels except for a last channel are closed; and if so:

close the last channel;

close the current rotation;

allocate a new memory space in the buffer memory for a new rotation; and move the optical pickup to a position relative to the optical disk such that a next set of multiple data tracks are simultaneously read.

21. A method of reading a sequential chain of data blocks to a host computer by simultaneously reading multiple data tracks of an optical disk, the method comprising:

reading data from the multiple data tracks of the optical disk simultaneously with an optical pickup;

converting the data signal for each one of the multiple data tracks into a plurality of channels, each channel containing data blocks for one of the multiple data tracks;

storing the plurality of channels in a memory space in a buffer memory; and logically linking a data block of a first channel to a first data block of an adjacent channel to generate a sequential chain of data blocks spanning at least two channels.

22. The method of claim 21 wherein converting the data signal front further comprises:

receiving a data signal from the optical pickup for each one of the multiple data tracks and generating a stream of bits corresponding to data stored in a respective one of the multiple data tracks, the stream of bits being synchronized and organized into data words;

organizing and decoding the data words into data blocks to provide a plurality of channels.

23. The method of claim 21 further comprising:

receiving a read command from the host computer, the read command requesting a sequential range of data blocks to be read from the optical disk.

24. The method of claim 23 further comprising moving an optical head to a position relative to the optical disk so that at least one of the data blocks requested in the read command is located in one of the multiple data tracks.

25. The method of claim 21 further comprising:

allocating a memory space in buffer memory to enable storage of one or more of the plurality of channels.

26. The method of claim 23 wherein receiving the read command from the host computer further comprises checking in a database identifying data blocks stored in the buffer memory whether a sequential set of data blocks requested by the read command are available in the buffer memory.

27. The method of claim 23 wherein each data block has a data block ID number and receiving the read command from the host computer further comprises discarding data blocks in the buffer memory having data block ID numbers lower than a lowest data block ID number requested in the read command.

28. The method of claim 21 wherein storing the plurality of channels in a memory space in a buffer memory further comprises:

receiving a data block for one of the plurality of channels;

checking whether the data block is a first data block received for that channel; and marking that channel as active and performing a range check if the data block is the first data block received for that channel.

29. The method of claim 28 wherein each data block has a data block ID number and performing a range check comprises checking that a first data block requested in a read command has a data block ID number greater than or equal to the data block ID number of a first data block received for a first channel, and less than or equal to the data block ID number of a first data block received for a last channel.

30. The method of claim 28 wherein each data block has a data block ID number and performing a range check comprises:

computing a lowest data block ID number and a highest data block ID number responsive to the data block ID number of a first data block received from any one of the plurality of channels; and checking that a first data block requested in a read command has a data block ID number greater than or equal to the lowest data block ID number and less than or equal to the highest data block ID number.

31. The method of claim 21 wherein storing the plurality of channels further comprises:

checking that all channels are providing data blocks; and marking any channels that are not providing data blocks.

32. The method of claim 21 wherein each data block has a data block ID number and storing the plurality of channels further comprises:

receiving a data block for one of the plurality of channels;

checking that the data block ID number is valid; and performing a fix forward function if the data block ID number is not valid and a data block ID number of a first data block of that channel is valid.

33. The method of claim 21 wherein each data block has a data block ID number and storing the plurality of channels further comprises:

receiving a data block for one of the plurality of channels;

checking that the data block ID number is valid; and performing a fix backward function if the data block ID number is valid and a data block ID number of a first data block of that channel is not valid.

34. The method of claim 21 wherein logically linking a data block of a first channel to a first data block of an adjacent channel further comprises:

checking whether the data block ID number of a data block received in a first channel is one less than the data block ID number of a first data block received from an adjacent channel; and if so, creating a link between the data block received for the first channel and the first data block of the adjacent, and closing the first channel.

35. The method of claim 21 wherein logically linking a data block of a first channel to a first data block of an adjacent channel further comprises:

checking whether the data block ID number of a data block received for a first channel is greater than or equal to the data block ID number of a first data block received for an adjacent channel; and if so:

searching backwards in a list of blocks received for the first channel for a linkable data block having a data block ID number one less than the data block ID number of the first block received for the adjacent channel;

linking the linkable data block to the first data block of the adjacent channel;

closing the first channel; and discarding data blocks received for the first channel having data block ID numbers greater than the data block ID number of the linkable data block.

36. The method of claim 21 wherein the buffer memory is organized into rotations, each rotation identifying storage locations of the data blocks for each one of the plurality of channels for at least one revolution of the optical disk.

37. The method of claim 36 wherein storing the plurality of channels further comprises marking a rotation as a bad rotation if a number of data blocks received from any one of the plurality of channels exceeds a predetermined maximum number of data blocks.

38. The method of claim 36 wherein storing the plurality of channels further comprises marking a rotation as a bad rotation if any one of the plurality of channels remains in an active state for a period of time longer than a predetermined time limit.

39. The method of claim 36, wherein storing the plurality of channels further comprises:

checking whether all of the plurality of channels except for a last channel are closed; and if so:

closing the last channel;

closing a current rotation;

allocating a new memory space in the buffer memory for a new rotation; and moving the optical pickup to a position relative to the optical disk so that a next set of multiple tracks are simultaneously read.

40. The method of claim 36, wherein closing the current rotation further comprises:

determining if the current rotation is a first rotation containing a data block requested by a read command; and if not:

searching for a linkable data block in the current rotation that immediately follows a last data block in an immediately previous rotation;

linking the last data block in the immediately previous rotation to the linkable data block; and discarding data blocks in the current rotation that overlap with data blocks in the immediately previous rotation.

* * * * *